US010621588B2

(12) United States Patent
Das

(10) Patent No.: US 10,621,588 B2
(45) Date of Patent: Apr. 14, 2020

(54) METHOD FOR AUTHORIZING A TRANSACTION REQUEST FOR A PAYMENT CARD

(71) Applicant: MasterCard International Incorporated, Purchase, NY (US)

(72) Inventor: Subrat Das, Pune (IN)

(73) Assignee: Mastercard International Incorporated, Purchase, NY (US)

(*) Notice: Subject to any disclaimer, the term of this patent is extended or adjusted under 35 U.S.C. 154(b) by 571 days.

(21) Appl. No.: 15/377,479

(22) Filed: Dec. 13, 2016

(65) Prior Publication Data

US 2017/0186006 A1 Jun. 29, 2017

(30) Foreign Application Priority Data

Dec. 29, 2015 (SG) .......................... 10201510737Q

(51) Int. Cl.
*G06Q 20/40* (2012.01)
*G06Q 20/34* (2012.01)
*G06Q 20/10* (2012.01)

(52) U.S. Cl.
CPC ......... *G06Q 20/405* (2013.01); *G06Q 20/108* (2013.01); *G06Q 20/3578* (2013.01); *G06Q 20/35785* (2013.01)

(58) Field of Classification Search
CPC .................................................. G06Q 20/405
(Continued)

(56) References Cited

U.S. PATENT DOCUMENTS

2004/0193610 A1  9/2004  Alex et al.
2005/0065877 A1* 3/2005  Cleary .................. G06Q 20/10
                                                         705/39
(Continued)

FOREIGN PATENT DOCUMENTS

JP    2004-110352 A    4/2004
JP    2004-164446 A    6/2004
(Continued)

OTHER PUBLICATIONS

"Enpulz, L.L.C.; Researchers Submit Patent Application, 'Proxy Card Providing Indirect Funds Access', for Aproval." Politics & Government Week. Atlanta: NewsRx. Mar. 21, 2013 (Year: 2013).*
(Continued)

*Primary Examiner* — Sara C Hamilton
(74) *Attorney, Agent, or Firm* — Buckley, Maschoff & Talwalkar LLC

(57) ABSTRACT

A method for authorizing a transaction request for a payment card is disclosed, the method comprising the steps of receiving at a transaction processing platform, data indicating that a first authorization request for the payment card has been declined; referencing at the transaction processing platform, a circuit of payment cards where the circuit of payment cards comprises the payment card, at least one other payment card and association data indicative of the association between the payment card and the at least one other payment card; selecting at the transaction processing platform, a second payment card from the at least one other payment card based on the association data; identifying at the transaction processing platform, an issuer server associated with the second payment card; and sending from the transaction processing platform to the issuer server, a second authorization request for the second payment card.

22 Claims, 11 Drawing Sheets

(58) Field of Classification Search
USPC .......................................................... 705/35
See application file for complete search history.

(56) References Cited

U.S. PATENT DOCUMENTS

| | | | | |
|---|---|---|---|---|
| 2011/0180598 | A1* | 7/2011 | Morgan | G06Q 20/02 |
| | | | | 235/380 |
| 2011/0302084 | A1* | 12/2011 | Melik-Aslanian | G06Q 20/10 |
| | | | | 705/44 |
| 2015/0095225 | A1* | 4/2015 | Appana | G06Q 20/3674 |
| | | | | 705/41 |
| 2015/0142657 | A1* | 5/2015 | Sagastiverza | G06Q 20/351 |
| | | | | 705/44 |
| 2017/0004500 | A1* | 1/2017 | Lim | G06Q 20/405 |

FOREIGN PATENT DOCUMENTS

| | | | |
|---|---|---|---|
| JP | 2005-100334 | A | 4/2005 |
| JP | 2005-208874 | A | 8/2005 |
| JP | 2006-313440 | A | 11/2006 |
| JP | 2016-071660 | A | 5/2016 |
| JP | 2016-148913 | A | 8/2016 |

OTHER PUBLICATIONS

"PCT Notification of Transmittal of the International Search Report and the Written Opinion" International Searching Authority, dated Mar. 7, 2017, for International Application No. PCT/US2016/065056, 7 pp.

* cited by examiner

109

| Circuit identifier 1 | - PAN 1 105<br>- rank<br>(secondary) | - PAN 2 106<br>- rank<br>(primary) | - PAN 3 107<br>- rank<br>(secondary) |
|---|---|---|---|
| Circuit identifier 2 | - PAN 4<br>- rank<br>(primary) | - PAN 5<br>- rank<br>(secondary) | - PAN 6<br>- rank<br>(secondary) |

| Circuit identifier 1 | PAN 1 105 – PAN 2 106<br>PAN 2 106 – PAN 3 107<br>PAN 3 107 – PAN 1 105 |
|---|---|
| Circuit identifier 2 | PAN 4 – PAN 5<br>PAN 5 – PAN 6<br>PAN 6 – PAN 4 |

Figure 4(b)

| | | | |
|---|---|---|---|
| Circuit identifier 1 | - PAN 1 105<br>- rank<br>(secondary) | - PAN 2 106<br>- rank<br>(primary) | - PAN 3 107<br>- rank<br>(secondary) |
| Circuit identifier 2 | - PAN 4<br>- rank<br>(primary) | - PAN 5<br>- rank<br>(secondary) | - PAN 6<br>- rank<br>(secondary) |
| Circuit identifier 3 | - PAN 1 105<br>- rank<br>(secondary) | - PAN 7<br>- rank<br>(secondary) | - PAN 8<br>- rank<br>(secondary) |

Figure 8

METHOD FOR AUTHORIZING A TRANSACTION REQUEST FOR A PAYMENT CARD

CROSS-REFERENCE TO RELATED APPLICATION

This application is a U.S. National Stage filing under 35 U.S.C. § 119, based on and claiming benefit of and priority to SG Patent Application No. 10201510737Q filed Dec. 29, 2015.

TECHNICAL FIELD

The following discloses a method for authorizing a transaction request for a payment card.

BACKGROUND

There can be a multitude of reasons why credit card transactions get declined. For instance, the customer may have reached his credit limit on his credit card. Another possible reason could be due to the customer missing credit card payments which may have led to a freeze on the credit card account by the issuing bank. Another reason could be a hold on a certain portion of the card's limit (for example, if the card had been used to check into a hotel). It could also be as simple as a human error in mistyping the credit card number, expiration date, security code, or not realizing that the card had already expired and overlooked the new credit card in the mail.

Whatever the case may be, a declined credit card transaction creates a negative experience for the customer. It also means that the customer would have to find some other means to make payment, and in situations where the customer is unable to do so, would lead to a denied purchase for the customer. Furthermore, sometimes the root cause of the declined transaction is merely an innocent oversight on the customer's part, which can make the experience even more frustrating and unpleasant for the customer.

Therefore, there is a want for a novel method for authorizing a transaction request for a payment card, and thereby reducing the number of denied purchases.

Furthermore, other desirable features and characteristics will become apparent from the subsequent detailed description and the appended claims, taken in conjunction with the accompanying drawings and this background of the disclosure.

SUMMARY

According to a first aspect of the invention, a method for authorizing a transaction request for a payment card is described, the method comprising the steps of receiving at a transaction processing platform, data indicating that a first authorization request for the payment card has been declined; referencing at the transaction processing platform, a circuit of payment cards, the circuit of payment cards comprising the payment card, at least one other payment card and association data indicative of the association between the payment card and the at least one other payment card; selecting at the transaction processing platform, a second payment card from the at least one other payment card based on the association data; identifying at the transaction processing platform, an issuer server associated with the second payment card; and sending from the transaction processing platform to the issuer server, a second authorization request for the second payment card.

Preferably, the step of sending from the transaction processing platform to the issuer server the second authorization request for the second payment card further comprises the step of sending the second authorization request for the second payment card with data indicating that the second payment card will be acting as a proxy for authenticating the declined first authorization request for the payment card.

Preferably, the method further comprises the step of sending a message to a customer that the second payment card had been used as a proxy for authenticating the declined first authorization request for the payment card.

Preferably, the step of sending from the transaction processing platform to the issuer server the second authorization request for the second payment card further comprises the step of sending the second authorization request for the second payment card with data indicating that the second payment card will be acting as the payment tool for the transaction request for the payment card.

Preferably, the method further comprises the step of sending a message to a customer that the second payment card had been used as the payment tool for the transaction request for the payment card.

Preferably, the method further comprises the step of receiving at the transaction processing platform, an approved transaction confirmation from the issuer server.

Preferably, the method further comprises the step of forwarding from the transaction processing platform, the approved transaction confirmation to an acquirer bank server.

Preferably, the circuit of payment cards further comprises ranking data indicating a preferred selection order of the at least one other payment card, and wherein the selection of the second payment card from the at least one other payment card is further based on the ranking data.

Preferably, the selection of the second payment card from the at least one other payment card is further based on whether the ranking data indicates that the at least one other payment card is at or above a rank threshold.

Preferably, the selection of the second payment card from the at least one other payment card is further based on configuration parameters.

Preferably, the configuration parameters govern the selection of the second payment card from the at least one other payment card based on any one of the following: a type of merchant associated with the transaction request; a mode of the transaction request; a transaction value of the transaction request and a transaction velocity.

Preferably, the circuit of payment cards comprises the payment card, at least two other payment cards and association data indicative of the associations between the payment card and the at least two other payment cards, the method further comprising the steps of: receiving at the transaction processing platform from the issuer server, data indicating that the second authorization request for the second payment card has been declined; referencing at the transaction processing platform, the circuit of payment cards; selecting at the transaction processing platform, a third payment card from the at least two other payment cards; identifying at the transaction processing platform, another issuer server, the another issuer server associated with the third payment card; and sending from the transaction processing platform to the another issuer server, a third authorization request for the third payment card.

Preferably, the issuer server and the another issuer server are the same server.

Preferably, the circuit of payment cards further comprises a circuit identifier.

Preferably, the method further comprises the step of selecting at the transaction processing platform, the circuit of payment cards to be referenced based on the circuit identifier or circuit selection rules.

According to a second aspect of the invention, a transaction processing platform for authorizing a transaction request for a payment card is described, the transaction processing platform comprising at least one processor configured to: receive data indicating that a first authorization request for the payment card has been declined; reference a circuit of payment cards, the circuit of payment cards comprising the payment card, at least one other payment card and association data indicative of the association between the payment card and the at least one other payment card; select a second payment card from the at least one other payment card based on the association data; identify an issuer server associated with the second payment card; and send to the issuer server, a second authorization request for the second payment card.

Preferably, the at least one processor is further configured to send to the issuer server, the second authorization request for the second payment card with data indicating that the second payment card will be acting as a proxy for authenticating the declined first authorization request for the payment card.

Preferably, the at least one processor is further configured to send a message to a customer that the second payment card had been used as a proxy for authenticating the declined first authorization request for the payment card.

Preferably, the at least one processor is further configured to send to the issuer server, the second authorization request for the second payment card with data indicating that the second payment card will be acting as the payment tool for the transaction request for the payment card.

Preferably, the at least one processor is further configured to send a message to a customer that the second payment card had been used as the payment tool for the transaction request for the payment card.

Preferably, the at least one processor is further configured to receive an approved transaction confirmation from the issuer server.

Preferably, the at least one processor is further configured to forward the approved transaction confirmation to an acquirer bank server.

Preferably, the circuit of payment cards further comprises ranking data indicating a preferred selection order of the at least one other payment card, and wherein the at least one processor is further configured to select the second payment card from the at least one other payment card based on the ranking data.

Preferably, the at least one processor is further configured to select the second payment card from the at least one other payment card based on whether the ranking data indicates that the at least one other payment card is at or above a rank threshold.

Preferably, the at least one processor is further configured to select the second payment card from the at least one other payment card based on configuration parameters.

Preferably, the configuration parameters govern the selection of the second payment card from the at least one other payment card based on any one of the following: a type of merchant associated with the transaction request; a mode of the transaction request; a transaction value of the transaction request and a transaction velocity.

Preferably, the circuit of payment cards comprises the payment card, at least two other payment cards and association data indicative of the associations between the payment card and the at least two other payment cards, and wherein the at least one processor is further configured to: receive from the issuer server, data indicating that the second authorization request for the second payment card has been declined; reference the circuit of payment cards; select a third payment card from the at least two other payment cards; identify another issuer server, the another issuer server associated with the third payment card; and send to the another issuer server, a third authorization request for the third payment card.

Preferably, the issuer server and the another issuer server are the same server.

Preferably, the circuit of payment cards further comprises a circuit identifier.

Preferably, the at least one processor is further configured to select the circuit of payment cards to be referenced based on the circuit identifier or circuit selection rules.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments, by way of example only, and to explain various principles and advantages in accordance with certain embodiments.

FIGS. 4(a) and 4(b) show records in an exemplary database for storing circuit of payment cards.

FIG. 8 shows records in an exemplary database for storing a plurality of circuit of payment cards and whereby a payment card is a member of more than one circuit of payment cards.

Skilled artisans will appreciate that elements in the figures are illustrated for simplicity and clarity and have not necessarily been depicted to scale. For example, the dimensions of some of the elements in the block diagrams or steps in the flowcharts may be exaggerated in respect to other elements to help improve understanding of the present embodiments.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the preferred embodiments to disclose a novel method for authorizing a transaction request for a payment card.

In particular, the method comprises the steps of receiving data indicating that an authorization request for the payment card has been declined and referencing a circuit of payment cards, the circuit of payment cards comprising the payment card and other payment cards and association data indicative of the association between the payment card and the other payment cards. The method further comprises the steps of selecting one other payment card based on the association data, identifying an issuer server associated with the other payment card; and sending to the issuer server, an authorization request for the other payment card. The other payment card may either act as a proxy for authenticating the declined authorization request for the payment card or it may be used as the payment tool for the transaction request for the payment card.

This method is advantageous because it reduces the number of denied transactions. Furthermore, there can be instances where the reason for a declined authentication request of a payment card could be due to an innocent oversight on the customer's part (for example, when the customer does not realize that his payment card had already expired). Therefore, allowing another payment card to act as a proxy for authenticating the declined authentication request or to function as the payment tool avoids an otherwise unpleasant experience for the customer. Another advantage could be that it allows customers the flexibility to authorize transactions for each other within a family or a group of friends, or a group of colleagues. The flexibility to authorize transactions for one another could be particularly pertinent in a family set-up, where the parent's payment card could authorize a transaction request for their child's payment card.

Figure 1:
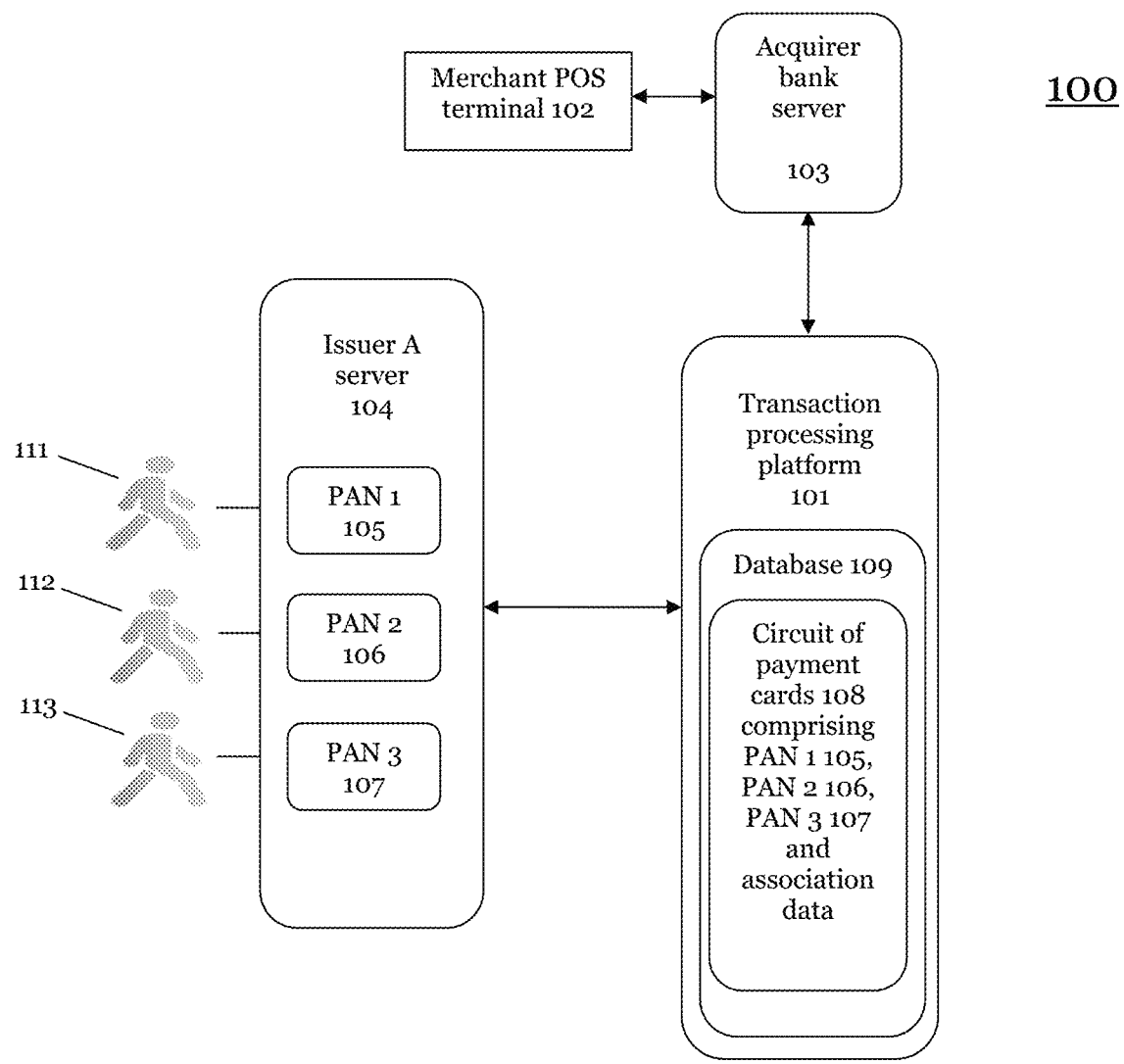
FIG. 1 shows a system in accordance with an embodiment of the invention.

FIG. 1 shows system 100 in accordance with an embodiment of the invention. System 100 comprises transaction processing platform 101. Transaction processing platform 101 could be operated by a payment network company (e.g. MasterCard®), or a financial institution, such as a bank or credit company. Merchant POS terminal 102 is communicable with acquirer bank server 103. Acquirer bank server 103 is the server of a bank which processes the merchant-related transactions. Acquirer bank server 103 is communicable with transaction processing platform 101.

Transaction processing platform 101 is communicable with issuer A server 104. Issuer A server 104 is managed by issuer A. Payment card PAN (primary account number) 1 105 is issued by issuer A. Payment card PAN (primary account number) 2 106 is also issued by issuer A. Payment card PAN (primary account number) 3 107 is also issued by issuer A. Issuer A server 104 stores PAN 1 105, PAN 2 106 and PAN 3 107. Payments cards PAN 1 105, PAN 2 106 and PAN 3 107 belong to different customers. Payment card PAN 1 105 belongs to customer 111. Payment card PAN 2 106 belongs to customer 112. Payment card PAN 3 107 belongs to customer 113.

Examples of payment cards (PAN 1 105, PAN 2 106 and PAN 3 107) can include a credit card, a debit card, smart card or a prepaid card that are registered to the respective customer (111, 112, 113). Payments cards do not necessarily require a physical form or a form factor. Payment cards can be in the electronic form e.g. stored in digital wallet applications, smartphones, wearable payment devices, contactless devices (such as key fobs) etc. For example, a virtual prepaid card falls under the definition of a payment card even though no corresponding physical card will ever be issued. In essence, payment cards are any type of transactional or payment devices which are linked to a source of funds or credit or points (or the like) which can be applied in electronic transactions.

Transaction processing platform 101 stores circuit of payment cards 108. Circuit of payment cards 108 comprises the payment cards (i.e. PAN 1 105, PAN 2 106 and PAN 3 107), and association data indicative of the associations between the payment cards. Each payment card in circuit of payment cards 108 is a member of circuit of payment cards 108. In this instance, circuit of payment cards 108 comprises PAN 1 105, PAN 2 106 and PAN 3 107. Therefore, PAN 1 105, PAN 2 106 and PAN 3 107 are members of circuit of payment cards 108. The association data could be that PAN 1 105, PAN 2 106 and PAN 3 107 are stored in database 109 in a close proximity arrangement, or in a group, or in a single column or in a row which indicates their association with one another. Preferably, circuit of payment cards 108 also comprises a circuit identifier. The circuit identifier can also function as the association data as two payment cards which share the same circuit identifier would mean that the payment cards are associated. Barring certain rules or configuration parameters (which are elaborated on later in this document), each payment card within circuit of payment cards 108 can either act as a proxy for authenticating a declined authorization request for another payment card within circuit of payment cards 108, or act as the payment tool for the transaction request for the another payment card.

Figure 2:
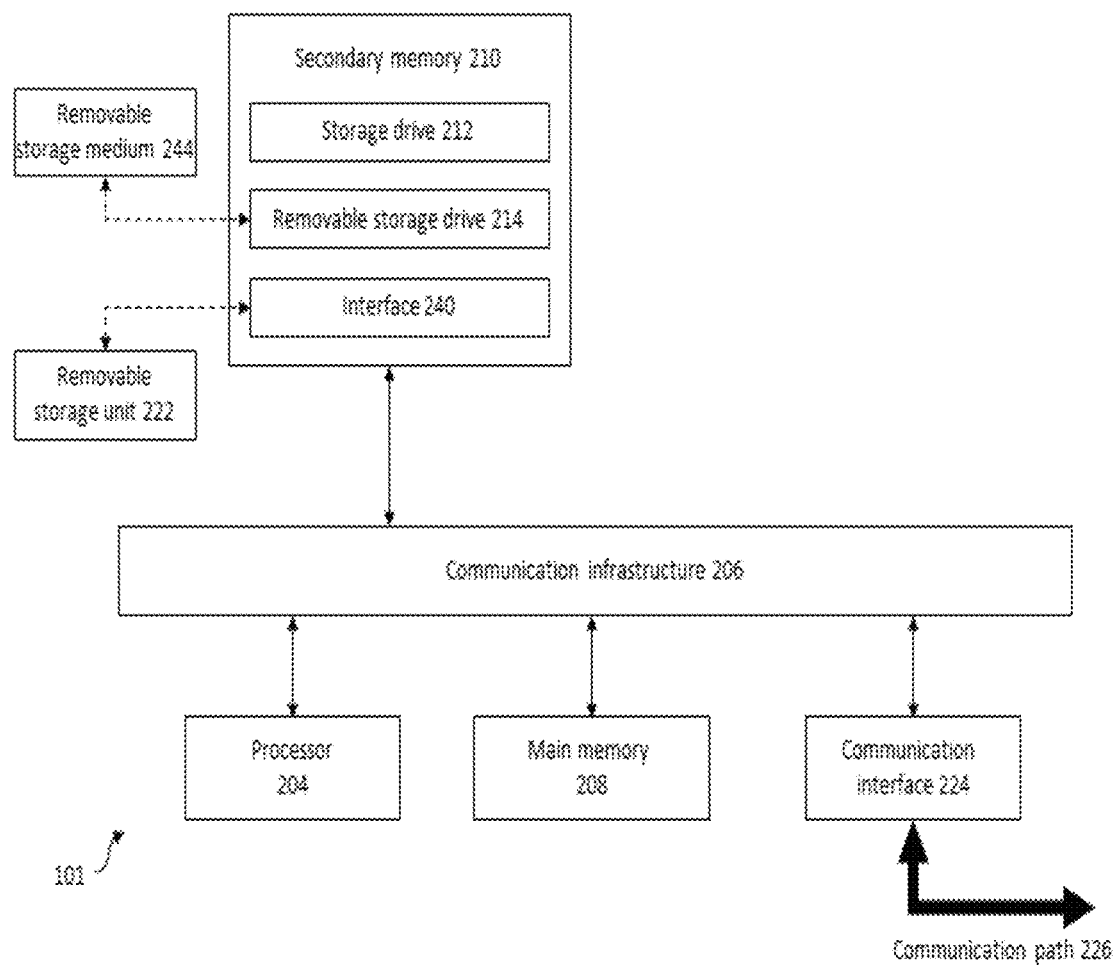
FIG. 2 shows an exemplary transaction processing platform for performing the functions in accordance with an embodiment of the invention.

The following description of transaction processing platform 101 is provided by way of example only and is not intended to be limiting. Transaction processing platform 101 may be a server or comprise a plurality of servers. As shown in FIG. 2, the exemplary transaction processing platform 101 includes a processor 204 for executing software routines. Although a single processor is shown for the sake of clarity, transaction processing platform 101 may also include a multi-processor system. The processor 204 is connected to a communication infrastructure 206 for communication with other components of transaction processing platform 101. The communication infrastructure 206 may include, for example, a communications bus, cross-bar, or network. Transaction processing platform 101 further includes a main memory 208, such as a random access memory (RAM), and a secondary memory 210.

The secondary memory 210 may include, for example, a storage drive 212, which may be a hard disk drive, a solid state drive or a hybrid drive and/or a removable storage drive 214, which may include a magnetic tape drive, an optical disk drive, a solid state storage drive (such as a USB flash drive, a flash memory device, a solid state drive or a memory card), or the like. The removable storage drive 214 reads from and/or writes to a removable storage medium 244 in a well-known manner. The removable storage medium 244 may include magnetic tape, optical disk, non-volatile memory storage medium, or the like, which is read by and written to by removable storage drive 214. As will be appreciated by persons skilled in the relevant art(s), the removable storage medium 244 includes a computer readable storage medium having stored therein computer executable program code instructions and/or data. In an alternative implementation, the secondary memory 210 may additionally or alternatively include other similar means for allowing computer programs or other instructions to be loaded into transaction processing platform 101. Such means can include, for example, a removable storage unit 222. Examples of a removable storage unit 222 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 222 which allow software and data to be transferred from the removable storage unit 222 to transaction processing platform 101. Database 109 containing circuit of payments cards 108 may be stored in either storage drive 212, or removable storage drive 214, or may be accessed remotely by transaction processing platform 101 via interface 240.

Transaction processing platform 101 also includes at least one communication interface 224. The communication interface 224 allows software and data to be transferred between transaction processing platform 101 and external devices via a communication path 226. For example, data can be transferred between transaction processing platform 101 and issuer A server 104 and acquirer bank server 103 via communication interface 224. In various embodiments of the inventions, the communication interface 224 permits data to be transferred between transaction processing platform 101 and a data communication network, such as a public data or private data communication network. Examples of a communication interface 224 can include a modem, a network interface (such as an Ethernet card), a communication port (such as a serial, parallel, printer, GPIB, IEEE 1394, RJ45, USB), an antenna with associated circuitry and the like. The communication interface 224 may be wired or may be wireless. Software and data transferred via the communication interface 224 are in the form of signals which can be electronic, electromagnetic, optical or other signals capable of being received by communication interface 224. These signals are provided to the communication interface via the communication path 226.

Software may be stored in a computer program product and loaded into transaction processing platform 101 using the removable storage drive 214, the storage drive 212, or the interface 240. Alternatively, the computer program product may be downloaded to transaction processing platform 101 over the communications path 226. The software, when executed by the processor 204, causes transaction processing platform 101 to perform functions of embodiments described herein. It is to be understood that the embodiment of FIG. 2 is presented merely by way of example. Therefore, in some embodiments one or more features of transaction processing platform 101 may be omitted. Also, in some embodiments, one or more features of transaction processing platform 101 may be combined together. Additionally, in some embodiments, one or more features of transaction processing platform 101 may be split into one or more component parts.

As used herein, the term "computer program product" may refer, in part, to removable storage medium 244, removable storage unit 222, a hard disk installed in storage drive 212, or a carrier wave carrying software over communication path 226 (wireless link or cable) to communication interface 224. Computer readable storage media or medium refers to any non-transitory, non-volatile tangible storage medium that provides recorded instructions and/or data to transaction processing platform 101 for execution and/or processing. Examples of such storage media include magnetic tape, CD-ROM, DVD, Blu-Ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of transaction processing platform 101.

Examples of transitory or non-tangible computer readable transmission media that may also participate in the provision of software, application programs, instructions and/or data to transaction processing platform 101 include radio or infra-red transmission channels as well as a network connection to another computer or networked device, and the Internet or Intranets including e-mail transmissions and information recorded on Websites and the like.

Figure 3:
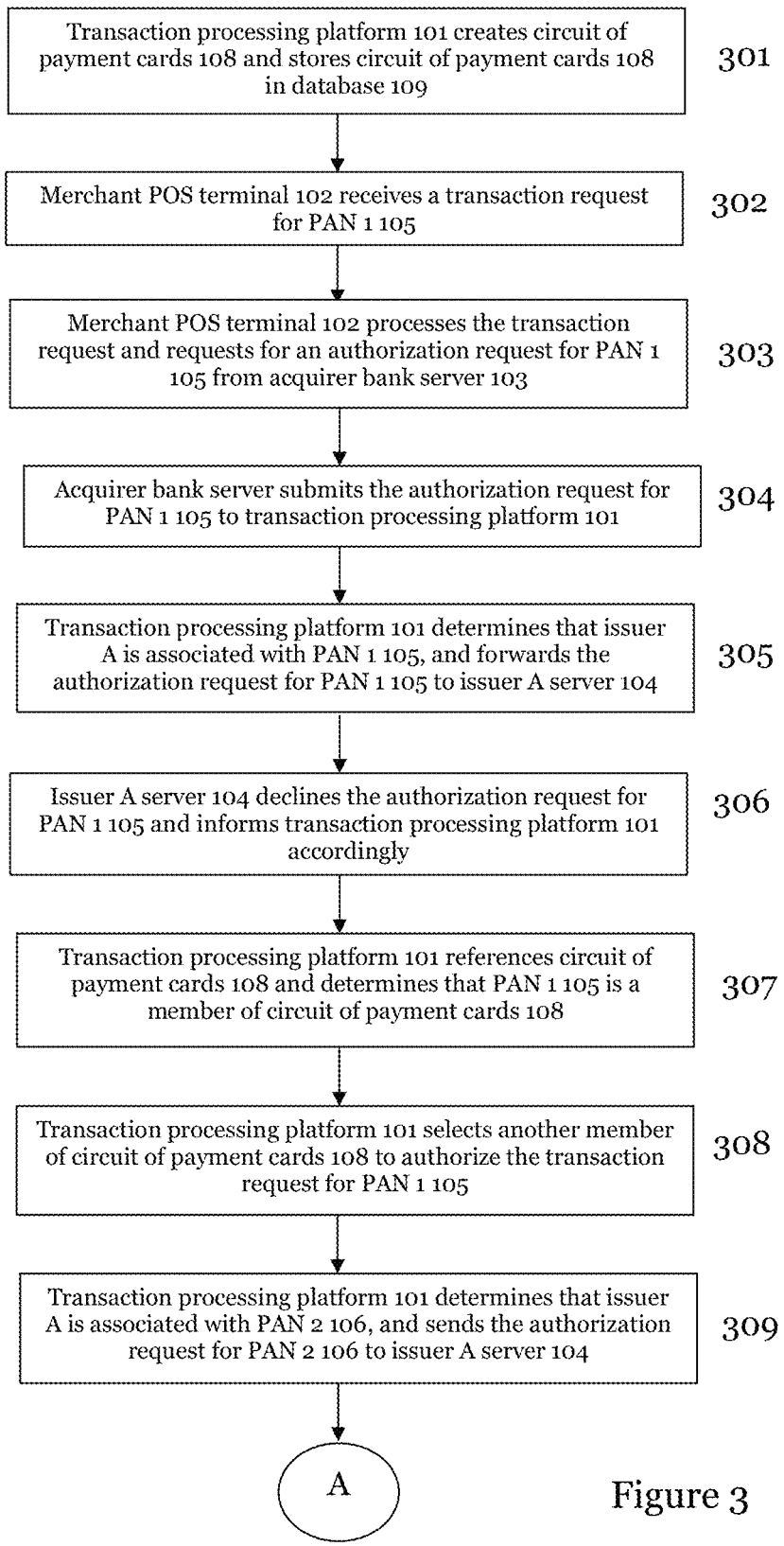
FIG. 3 shows a method for using another payment card to authorize a transaction request for a payment card in accordance with a preferred embodiment.
Figure 3:
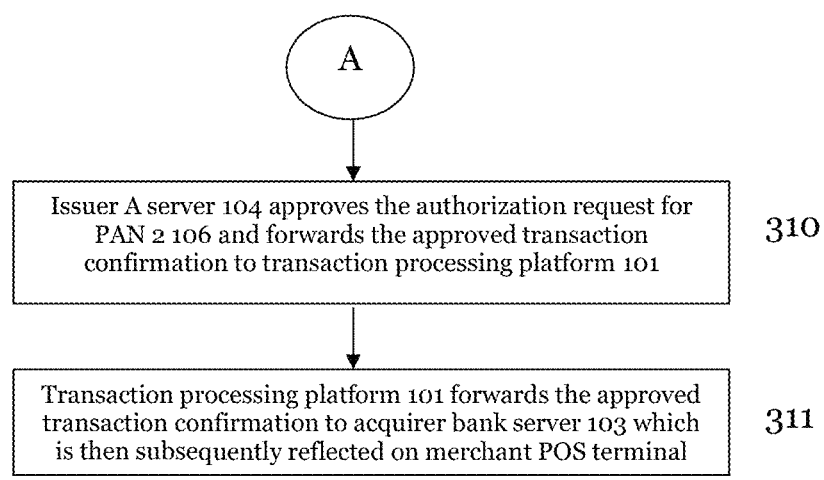

FIG. 3 shows a method for authorizing a transaction request for a payment card in accordance with a preferred embodiment.

In step 301, transaction processing platform 101 creates circuit of payment cards 108 and stores circuit of payment cards 108 in database 109. In this instance, circuit of payment cards 108 comprises payment cards PAN (primary account number) 1 105, PAN 2 106 and PAN 3 107, and association data indicative of the associations between the payment cards. Payment cards PAN 1 105, PAN 2 106 and PAN 3 107 are members of circuit of payment cards 108. This may be in response to issuer A server 104 communicating to transaction processing platform 101 that PAN 1 105, PAN 2 106 and PAN 3 107 are to be associated or linked. This translates to customer 111, customer 112 and customer 113 having made an agreement to authorize transactions for one another.

FIGS. 4(*a*) and 4(*b*) shows records in an exemplary database 109 storing circuit of payment cards 108 and circuit of payment cards 403. Referring to FIG. 4(*a*), circuit of payment cards 108 and circuit of payment cards 403 each comprises a plurality of members (or payment cards) and association data indicative of the associations between the payment cards. The association data could be that PAN 1 105, PAN 2 106 and PAN 3 107 are arranged in a single row in database 109 as shown in FIG. 4(*a*) which indicates their association with one another. Preferably, circuit of payment cards 108, 403 comprises circuit identifier 401. Circuit identifier 401 is a unique group identifier which transaction processing platform 101 has created and has associated to circuit of payment cards 108, 403 to uniquely identify it from other circuit of payment cards. Circuit identifier 401 can also function as the association data as if PAN 1 105, PAN 2 106 and PAN 3 107 share the same circuit identifier 401, this would mean that PAN 1 105, PAN 2 106 and PAN 3 107 are associated.

In some embodiments, circuit of payment cards 108, 403 comprises ranking data 402. Ranking data 402 provides an indication of the preferred selection order of the payment cards when determining which of the payment cards in circuit of payment cards 108, 403 should be selected next to authorize the transaction request. For example, if there is a declined authorization request for PAN 1 105, transaction processing platform 101 will first select PAN 2 106 over PAN 3 107 in circuit of payment cards 108 to authorize the transaction request for PAN 1 105. This is because PAN 2 106 has a "primary" rank while PAN 3 107 has a "secondary" rank.

In providing a real world scenario, customer 111 (who owns PAN 1 105) may be a teenager while customer 112 (who owns PAN 2 106) may be the teenager's father while customer 113 (who owns PAN 3 107) may be the teenager's mother. If following a transaction request for PAN 1 105, an authorization request for PAN 1 105 is declined, transaction processing platform 101 will first select PAN 2 106 over PAN 3 107 due to its higher rank to authorize the transaction request. Transaction processing platform 101 will then send an authorization request for PAN 2 106 to issuer A server 104. If the authorization request for PAN 2 106 is successful, PAN 2 106 can either act as a proxy for authenticating the declined authorization request for PAN 1 105, or it may be used as the payment tool for the transaction request.

In another scenario, if following a transaction request for PAN 3 107, an authorization request for PAN 3 107 is declined, transaction processing platform 101 will first select PAN 2 106 over PAN 1 105 to authorize the transaction request as PAN 2 106 has a "primary" rank while PAN 1 105 has a "secondary" rank. Transaction processing platform 101 will then send an authorization request for PAN 2 106 to issuer A server 104. In the event that the authorization request for PAN 2 106 is also declined, transaction processing platform 101 will then select PAN 1 105 to authorize the transaction request for PAN 3 105. Transaction processing platform 101 will then send an authorization request for PAN 1 105 to issuer A server 104. If the authorization request for PAN 1 105 is successful, PAN 1 105 can either act as a proxy for authenticating the declined authorization request for PAN 3 107, or it may be used as the payment tool for the transaction request.

In some embodiments, circuit of payment cards 108, 403 do not comprise ranking data 402 and the payment card selected to authorize the transaction is done randomly.

In some embodiments, the transaction processing platform 101 may be configured with rules such that pairwise relationships in the circuit of payment cards 108, 403 are defined hierarchically. The rules may be stored in database 109. For example, members of the circuit of payment cards 108, 403 at a certain rank threshold or above may authorize transaction requests for each other, and for members which are below the threshold, but members below the threshold may not authorize transaction requests for members at or above the threshold. To illustrate this using the example shown in FIG. 4(a), PAN 2 106 may be configured to authorize transaction requests for either PAN 1 105 or PAN 3 107, and PAN 1 105 and PAN 3 107 may be able to authorize transaction requests for each other, but neither can authorize transaction requests for PAN 2 106. In some embodiments, records in the database 109 may include an additional field to define a preferred order within a rank. For example, within circuit of payment cards 108, 403, although PAN 1 105 and PAN 3 107 are both ranked as "secondary", PAN 1 105 may be the preferred member to authorize transaction requests, and could be assigned a higher preferred order than PAN 3 107. Whether or not a member may authorize transaction requests for other members, and the order of preference of that member in authorizing transaction requests, may be user-configurable, for example via a user interface module (not shown) of the transaction processing platform 101.

In FIG. 4(b), the payment cards are stored as ordered pairs, with the second member of each pair being the next payment card in the circuit of payment cards 108, 403 i.e. the second member in the pair will authorize transaction requests for the first member in the pair. The circuit of payment cards 108, 403 culminates or ends when the second member of the final pair is the same as the first member of the first pair (see FIG. 4(b)).

In step 302, merchant POS terminal 102 receives a transaction request for PAN 1 105. The transaction request is initiated by customer 111. The transaction request may contain the relevant payment card security features, for example, card security code or PIN (personal identification number).

In step 303, merchant POS terminal 102 processes the transaction request and requests for an authorization request for PAN 1 105 from acquirer bank server 103.

In step 304, acquirer bank server 103 submits the authorization request for PAN 1 105 to transaction processing platform 101.

In step 305, transaction processing platform 101 determines that issuer A is associated with PAN 1 105, and forwards the authorization request for PAN 1 105 to issuer A server 104.

In step 306, issuer A server 104 declines the authorization request for PAN 1 105 and informs transaction processing platform 101 accordingly. The authorization request for PAN 1 105 may have been declined by issuer A server 104 because the funds or credit or points in the account associated with PAN 1 105 are insufficient to accommodate the transaction.

In step 307, transaction processing platform 101 references circuit of payment cards 108 and determines that PAN 1 105 is a member of circuit of payment cards 108.

In step 308, transaction processing platform 101 selects another member of circuit of payment cards 108 to authorize the transaction request for PAN 1 105. Platform 101 can determine the other members of circuit of payment cards 108 based on the association data. Preferably, circuit of payment cards 108 also comprises ranking data 402, and transaction processing platform 101 selects the other member of circuit of payment cards 108 to authorize the transaction request based on ranking data 402. For example, in the illustration provided above, transaction processing platform 101 selects PAN 2 106 over PAN 3 107 to authorize the transaction request as PAN 2 106 has a "primary" rank while PAN 3 107 has a "secondary" rank.

In step 309, transaction processing platform 101 determines that issuer A is associated with PAN 2 106, and sends the authorization request for PAN 2 106 to issuer A server 104. The authorization request for PAN 2 106 can be accompanied by data indicating that PAN 2 106 will be acting as a proxy for authenticating the declined authorization request for PAN 1 105. Alternatively, the authorization request for PAN 2 106 can be accompanied by data indicating that PAN 2 106 that will be acting as the payment tool for the transaction request for PAN 1 105.

In step 310, issuer A server 104 approves the authorization request for PAN 2 106 and forwards the approved transaction confirmation to transaction processing platform 101. For settlement, issuer A server 104 may post the transaction into the account associated with PAN 1 105. Alternatively, issuer A server 104 may post the transaction into the account associated with PAN 2 106. The settlement terms depends on what had been agreed between customer 111 and customer 112.

In step 311, transaction processing platform 101 forwards the approved transaction confirmation to acquirer bank server 103 which is then subsequently reflected on merchant POS terminal 102.

A text message may be sent to both customer 111 and customer 112, informing that customer 112 had authorized a transaction for customer 111 with PAN 2 106. As PAN 2 106 has functioned as an authorizer, customer 111 is thus able to successfully make a transaction despite issuer A server 104 having had earlier declined the authorization request for PAN 1 105. In effect, this reduces the number of failed transactions and enhances the overall customer experience.

Figure 5:
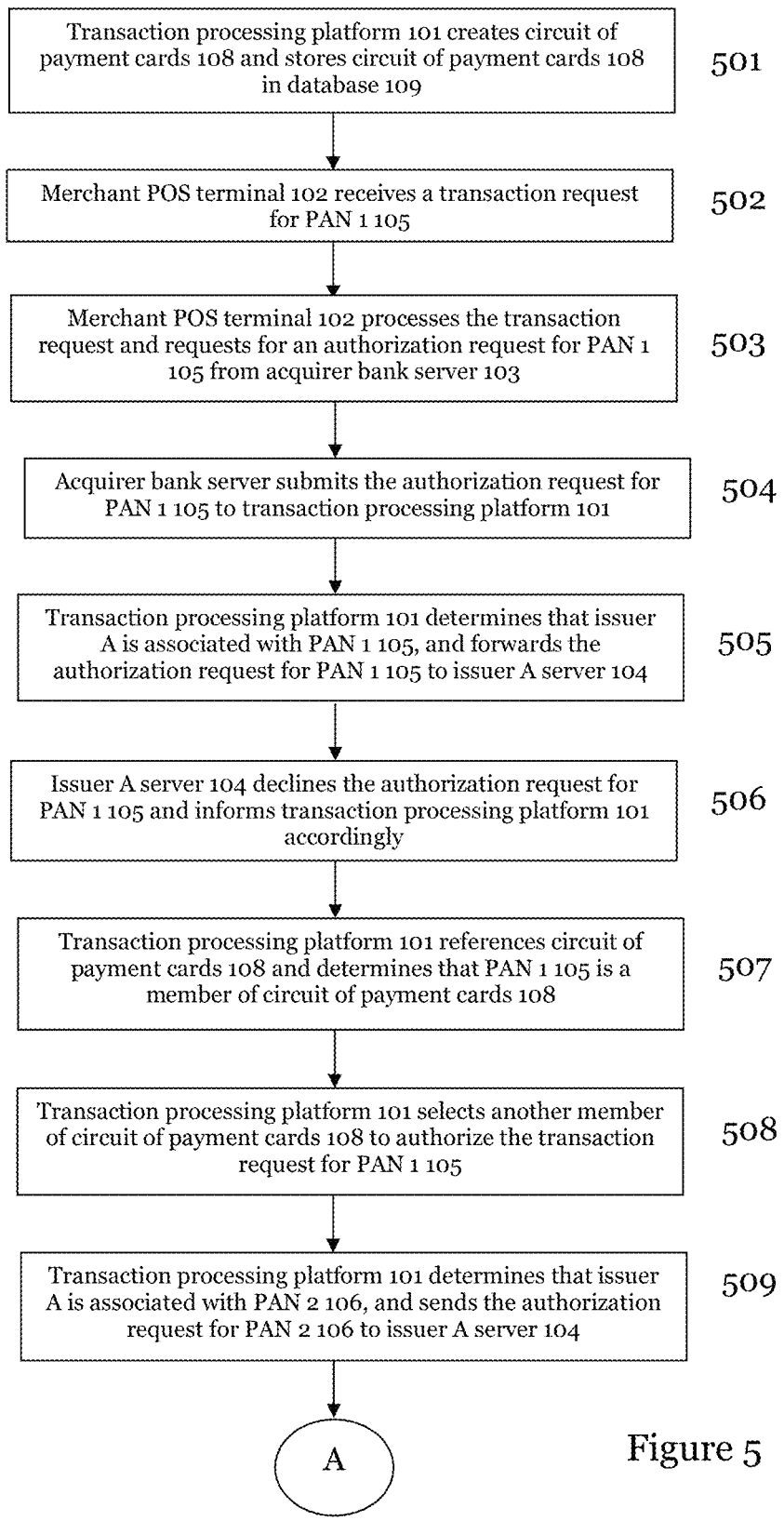
FIG. 5 shows a method for using yet another payment card to authorize a transaction request for a payment card.
Figure 5:
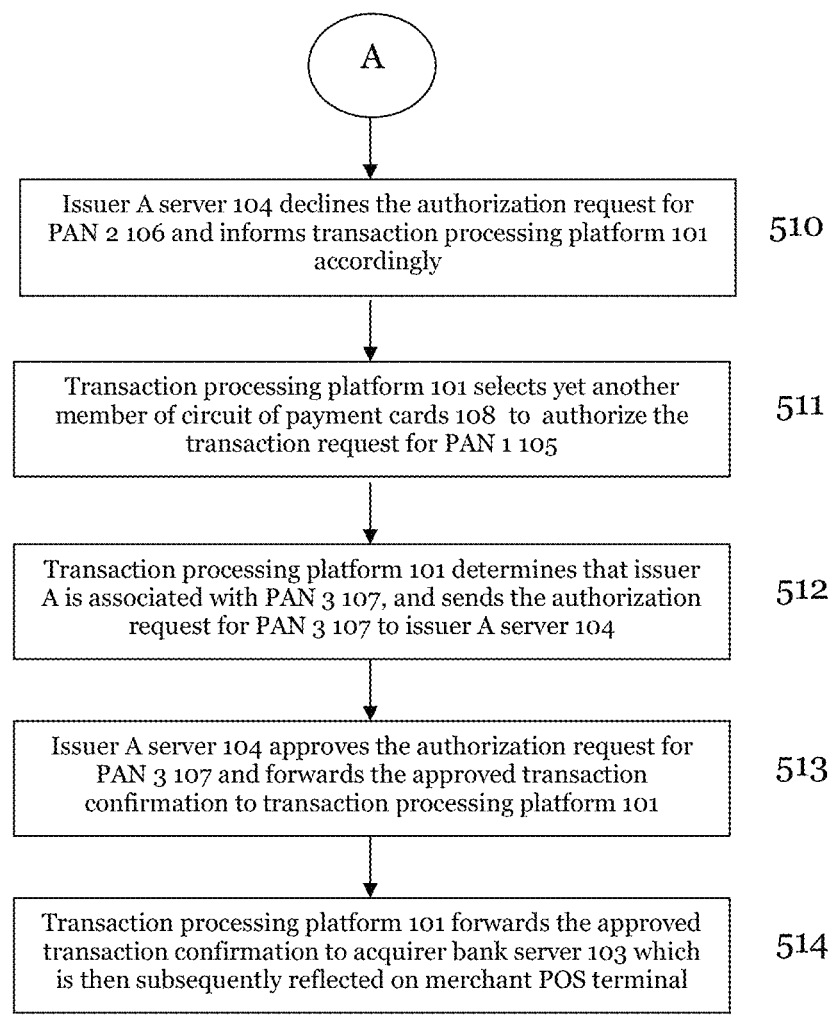

FIG. 5 shows a method for using yet another payment card to authorize a transaction request for the payment card. Steps 501 to 509 of FIG. 5 are similar to steps 301 to 309 of FIG. 3.

The similarity ends in step 510, where issuer A server 104 declines the authorization request for PAN 2 106 and informs transaction processing platform 101 accordingly. The reason for this could be that the recent credit history of PAN 2 106 may be below a certain threshold or expectation which prompts issuer A server 104 to consider PAN 2 106 to be inadequate to act as a proxy or a guarantor, or to act as the payment tool for the transaction request for PAN 1 105.

In step 511, transaction processing platform 101 selects yet another member of circuit of payment cards 108 to authorize the transaction request for PAN 1 105. For example, in the illustration provided above, transaction processing platform 101 selects PAN 3 107 to authorize the transaction request for PAN 1 105.

In step 512, transaction processing platform 101 determines that issuer A is associated with PAN 3 107, and sends the authorization request for PAN 3 107 to issuer A server 104. The authorization request for PAN 3 107 can be accompanied by data indicating that PAN 3 107 will be acting as a proxy for authenticating the declined authorization request for PAN 1 105. Alternatively, the authorization request for PAN 3 107 can be accompanied by data indicating that PAN 3 107 that will be acting as the payment tool for the transaction request for PAN 1 105.

In step 513, issuer A server 104 approves the authorization request for PAN 3 107 and forwards the approved transaction confirmation to transaction processing platform 101. For settlement, issuer A server 104 may post the transaction into the account associated with PAN 1 105. Alternatively, issuer A server 104 may post the transaction into the account associated with PAN 3 107. The settlement terms depends on what had been previously agreed between customer 111 and customer 113.

In step 514, transaction processing platform 101 forwards the approved transaction confirmation to acquirer bank server 103 which is then subsequently reflected on merchant POS terminal 102. Therefore, what has been demonstrated is a method whereby transaction processing platform 101 will attempt to authorize the transaction through all the other members in circuit of payment cards 108 before declining it.

Although it has been illustrated that there are only three members (PAN 1 105, PAN 2 106 and PAN 3 107) in circuit of payment cards 108, this is for illustration purposes only, and one skilled in the art will recognize that any practical number of members in circuit of payment cards 108 is also possible. Furthermore, although the illustrations have been described with the transactions occurring at merchant POS terminals, one skilled in the art will easily appreciate that the invention can work in a similar manner with electronic commerce (e-commerce) related transactions, mobile commerce (m-commerce) related transactions and any online related transactions.

Figure 6:
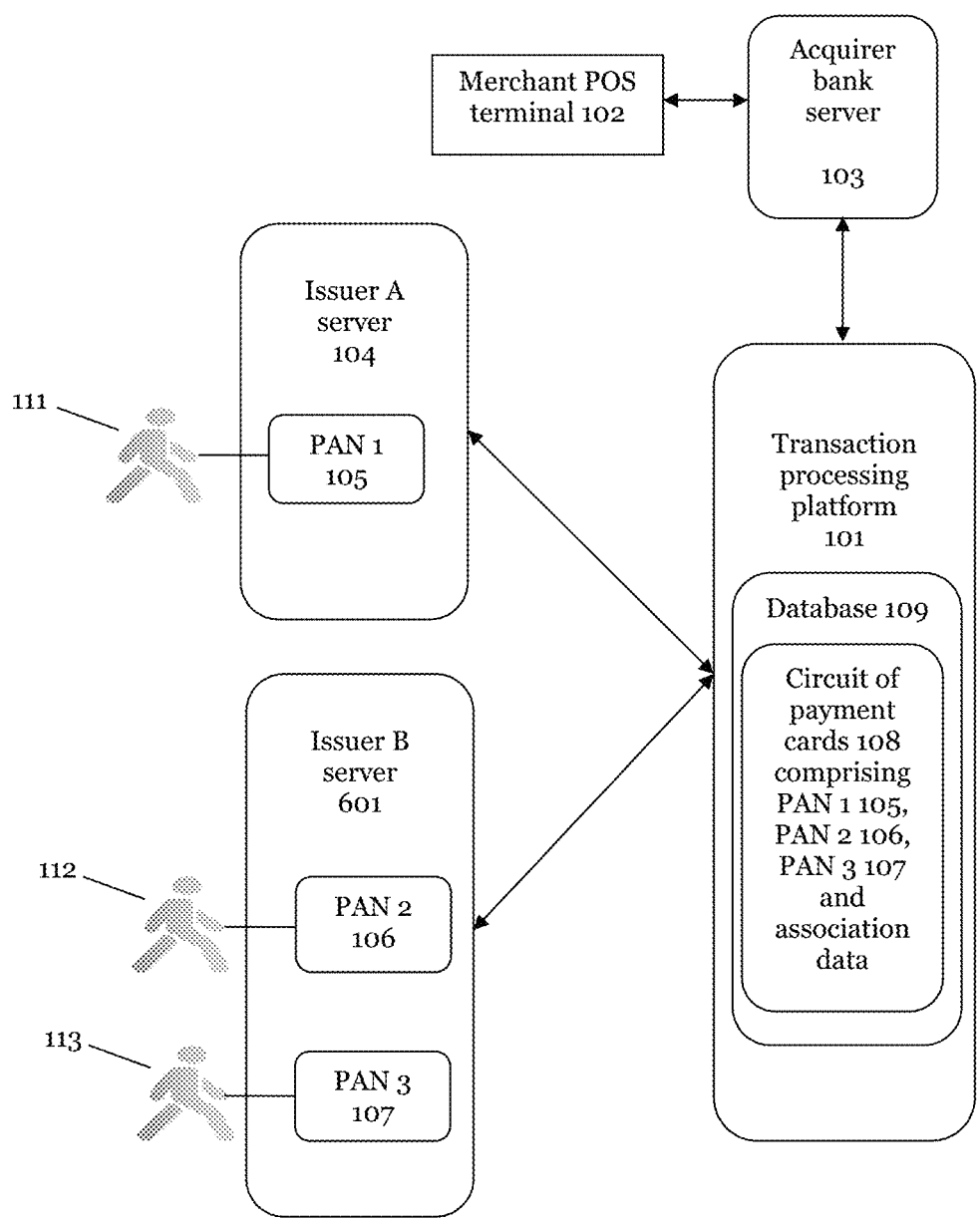
FIG. 6 shows an embodiment of the invention where the members of the circuit of payment cards are issued by different issuers.

In an embodiment, the members (or payment cards) of circuit of payment cards 108 can be issued by different issuers. FIG. 6 shows an embodiment of the invention where the members of circuit of payment cards 108 are issued by different issuers. PAN 1 105 is issued by issuer A, and PAN 2 106 and PAN 3 107 are issued by issuer B. As shown in FIG. 6, issuer A server 104 stores PAN 1 105 while issuer B server 601 stores PAN 2 106 and PAN 3 107.

Figure 7:
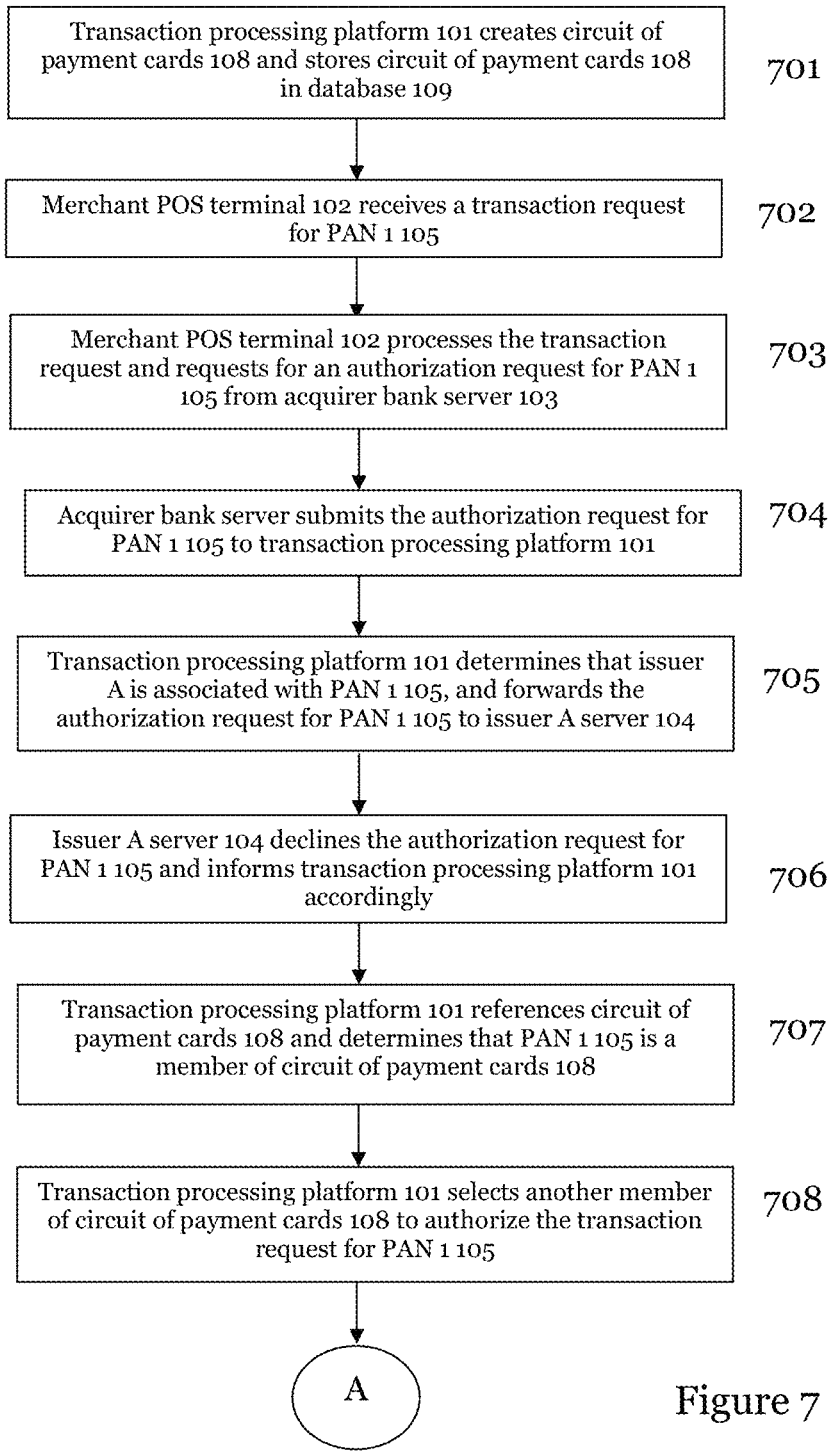
FIG. 7 shows a method for using a payment cards from different issuers to authorize the transaction request for the payment card.
Figure 7:
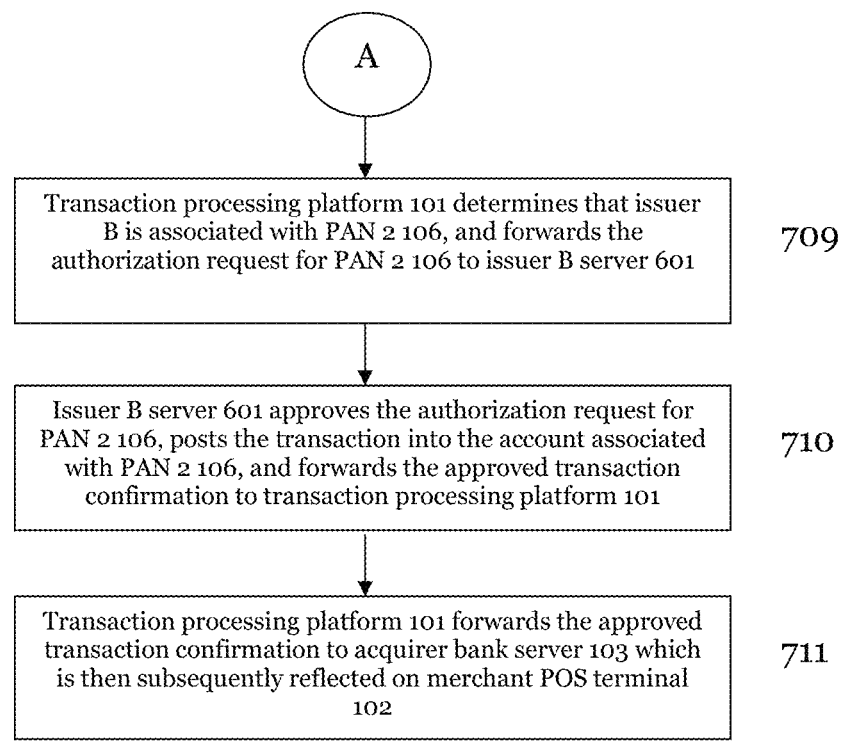

FIG. 7 shows a method for using payment cards from different issuers to authorize the transaction request for the payment card. Steps 701 to 708 of FIG. 7 are similar to steps 301 to 308 of FIG. 3.

The similarity ends in step 709, where transaction processing platform 101 determines that issuer B is associated with PAN 2 106, and forwards the authorization request for PAN 2 106 to issuer B server 601. The authorization request for PAN 2 106 can be accompanied by data indicating that PAN 2 106 that will be acting as the payment tool for the transaction request for PAN 1 105.

In step 710, issuer B server 601 approves the authorization request for PAN 2 106, posts the transaction into the account associated with PAN 2 106, and forwards the approved transaction confirmation to transaction processing platform 101.

In step 711, transaction processing platform 101 forwards the approved transaction confirmation to acquirer bank server 103 which is then subsequently reflected on merchant POS terminal 102. A text message may be sent to both customer 111 and customer 112, informing that customer 112 had settled a purchase for customer 111 with PAN 2 106.

In an embodiment, one PAN can be a member of more than one circuit of payment cards. FIG. 8 depicts database 109 having records storing circuit of payment cards 108, circuit of payment cards 403 and circuit of payment cards 801. PAN 1 105 can be both a member of circuit of payment cards 108 and a member of circuit of payment cards 801. Each circuit of payment cards 108, 403, 801 has circuit identifier 401. Circuit identifier 401 uniquely identifies each circuit of payment cards 108, 403, 801. Therefore, in scenarios where a particular payment card (e.g. PAN 1 105) is a member of more than one circuit of payment cards (e.g. 108, 801), transaction processing platform 101 receives the declined authorization request for PAN 1 105 from issuer A server 104 (steps 306, 506 and 706), along with the relevant circuit identifier 401 (e.g. circuit identifier 1). The combination of PAN 1 105 and the relevant circuit identifier 401 (e.g. circuit identifier 1) allows transaction processing platform 101 to ascertain which circuit of payment cards (e.g. 108) to reference (steps 307, 507 and 707), and therefore select the another member to authorize the transaction request for PAN 1 105 from that circuit of payment cards (steps 308, 508 and 708). In an another embodiment, there may be circuit selection rules stored in transaction processing platform 101 for the selection of which circuit of payment cards 108, 403, 801 to reference. The circuit selection rules may also comprise an order or sequence in which circuit of payments 108, 403 and 801 are referenced. For example, if circuit of payment cards 108 is the first circuit of payment cards to be referenced in the sequence, and if all the payment cards in circuit of payment cards 108 are declined, then transaction processing platform 101 will then reference the next circuit of payment cards in the sequence (e.g. circuit of payment cards 403). And if similarly all the payment cards in circuit of payment cards 403 are declined, then transaction processing platform 101 will then reference the next circuit of payment cards in the sequence (e.g. circuit of payment cards 801). The circuit selection rules may also be based on the parameters of the transaction (e.g. merchant type, mode of the transaction request a transaction value of the transaction request). In an another embodiment, the selection of which circuit of payment cards 108, 403, 801 to reference is made by the customer. For example, upon the declining of the authorization request for the customer's payment card, transaction processing platform 101 detects that the customer's payment card is member to a plurality of circuit of payment cards 108, 403, 801, transaction processing platform 101 then sends instructions to merchant POS terminal 102 to prompt the customer to select the circuit of payment of cards 108, 403, 801 to be referenced. This avoids the scenario where a customer is a member of both a "family" circuit and a "corporate" circuit, and the authorization of a transaction made in a "family" context should not be done by a member of the "corporate" circuit.

In some embodiments, the transaction processing platform 101 may provide for control over the types of transactions for which members of the circuits of payment cards 108, 403, 801 may authorize transactions or have other members authorize transactions for them. This control may be in the form of configuration parameters, and these configuration parameters may be stored (e.g., via the user interface module mentioned above) in database 109 to configure circuit of payment cards 108, 403, 801 such that one member of the circuit of payment cards 108, 403, 801 (which may be a payment card belonging to a minor) may only have other members of the circuit of payment cards 108, 403, 801 authorize transactions for particular merchant types (e.g., food and beverage) and/or in particular transaction modes (e.g., e-commerce transactions being excluded). Alternatively, or in addition, the other members of the circuit of payment cards 108, 403, 801 may only be allowed to authorize transactions up to a certain value, or up to a certain transaction velocity (transaction requests in a given time period).

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

In the application, unless specified otherwise, the terms "comprising", "comprise", and grammatical variants thereof, intended to represent "open" or "inclusive" language such that they include recited elements but also permit inclusion of additional, non-explicitly recited elements.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

The invention claimed is:

1. A method comprising:
receiving, by a processor at a transaction processing platform from an issuer server associated with a payment card, data indicating that a first authorization request for a transaction request for the payment card is declined;
referencing, by the processor at the transaction processing platform in response to the reception of the first authorization request being declined, a stored record of a circuit of payment cards, the circuit of payment cards comprising the payment card, at least one other payment card, and association data indicative of an association between the payment card and the at least one other payment card that permits each associated payment card in the circuit of payment cards to act as a proxy for authenticating a declined authorization request for another payment card within the circuit of payment cards or act as a payment tool for the transaction request for another payment card within the circuit of payment cards having declined authorization request;
selecting, by the processor at the transaction processing platform, a second payment card from the at least one other payment card based on the association data;
identifying, by the processor at the transaction processing platform, an issuer server associated with the second payment card;
sending, by the processor at the transaction processing platform to the issuer server associated with the second payment card, a second authorization request for the transaction request for the second payment card and the association data indicative of the association between the payment card and the second payment card that permits the second payment card to act as a proxy for authenticating the declined first authorization request for the payment card within the circuit of payment cards or act as a payment tool for the transaction request for the payment card within the circuit of payment cards having the declined first authorization request, wherein the issuer server associated with the second payment card approves the second authorization request for the transaction request and forwards the approved second authorization request for the transaction request to the transaction processing platform; and
forwarding, by the processor at the transaction processing platform, the approved second authorization request for the transaction request to an acquirer server.

2. The method of claim 1, wherein the sending, by the processor at the transaction processing platform to the issuer server associated with the second payment card, of the second authorization request for the second payment card further comprises sending the second authorization request for the second payment card with data indicating that the second payment card will be acting as a proxy for authenticating the declined first authorization request for the payment card with the association data indicative of the association between the payment card and the second payment card that permits the second payment card to act as a proxy for authenticating the declined first authorization request for the payment card.

3. The method of claim 2, further comprising sending, by the processor at the transaction processing platform, a message to a customer that the second payment card has been used as a proxy for authenticating the declined first authorization request for the payment card.

4. The method of claim 1, wherein the sending, by the processor at the transaction processing platform to the issuer server associated with the second payment card, the second authorization request for the second payment card further comprises sending the second authorization request for the second payment card with the association data indicative of the association between the payment card and the second payment card that permits the second payment card to act as a payment tool for the transaction request for the payment card.

5. The method of claim 4, further comprising sending, by the processor at the transaction processing platform, a message to a customer that the second payment card has been used as the payment tool for the transaction request for the payment card.

6. The method of claim 1, further comprising receiving, by the processor at the transaction processing platform, an approved transaction confirmation from the issuer server associated with the second payment card.

7. The method of claim 6, further comprising forwarding, by the processor at the transaction processing platform, the approved transaction confirmation to an acquirer bank server.

8. The method of claim 1, wherein the record of the circuit of payment cards further comprises ranking data indicating a preferred selection order of the at least one other payment card, wherein the selection of the second payment card from the at least one other payment card is further based on the ranking data.

9. The method of claim 1, wherein the selection of the second payment card from the at least one other payment card by the processor at the transaction processing platform is further based on configuration parameters.

10. The method of claim 9, wherein the configuration parameters govern the selection of the second payment card from the at least one other payment card based on any one of the following: a type of merchant associated with the transaction request; a mode of the transaction request; a transaction value of the transaction request and a transaction velocity.

11. The method of claim 1, wherein the record of the circuit of payment cards comprises the payment card, at least two other payment cards, and association data indicative of the associations between the payment card and the at least two other payment cards that permits each associated payment card in the circuit of payment cards to act as a proxy for authenticating a declined authorization request for another payment card within the circuit of payment cards or act as a payment tool for the transaction request for another payment card within the circuit of payment cards having declined authorization request, and further comprises:
   receiving, by the processor at the transaction processing platform from the issuer server associated with the second payment card, data indicating that the second authorization request for the second payment card has been declined;
   referencing, by the processor at the transaction processing platform in response to the reception of the second authorization request being declined, the record of the circuit of payment cards;
   selecting, by the processor at the transaction processing platform, a third payment card from the at least two other payment cards;
   identifying, by the processor at the transaction processing platform, an issuer server associated with the third payment card;
   sending, by the processor at the transaction processing platform to the issuer server associated with the third payment card, a third authorization request for the transaction request for the third payment card and the association data indicative of the association between the payment card and the third payment card that permits the third payment card to act as a proxy for authenticating the declined second authorization request for the second payment card within the circuit of payment cards or act as a payment tool for the second transaction request for the second payment card within the circuit of payment cards having the declined second authorization request, wherein the issuer server associated with the third payment card approves the third authorization request for the transaction request and forwards the approved third authorization request for the transaction request to the transaction processing platform; and
   forwarding, by the processor at the transaction processing platform, the approved third authorization request for the transaction request to an acquirer server.

12. A transaction processing platform comprising at least one processor configured to:
   receive, from an issuer server associated with a payment card, data indicating that a first authorization request for a transaction request for the payment card is declined;
   reference a circuit of payment cards, in response to the reception of the first authorization request being declined, a stored record of the circuit of payment cards comprising the payment card, at least one other payment card, and association data indicative of an association between the payment card and the at least one other payment card that permits each associated payment card in the circuit of payment cards to act as a proxy for authenticating a declined authorization request for another payment card within the circuit of payment cards or act as a payment tool for the transaction request for another payment card within the circuit of payment cards having declined authorization request;
   select a second payment card from the at least one other payment card based on the association data;
   identify an issuer server associated with the second payment card;
   send to the issuer server associated with the second payment card, a second authorization request for the transaction request for the second payment car and the association data indicative of the association between the payment card and the second payment card that permits the second payment card to act as a proxy for authenticating the declined second authorization request for the payment card within the circuit of payment cards or act as a payment tool for the transaction request for the payment card within the circuit of payment cards having the declined second authorization request, wherein the issuer server associated with the second payment card approves the second authorization request for the transaction request and forwards the approved second authorization request for the transaction request to the transaction processing platform; and
   forwarding the approved second authorization request for the transaction request to an acquirer server.

13. The transaction processing platform of claim 12, wherein the at least one processor is further configured to send to the issuer server associated with the second payment card, the second authorization request for the second payment card with data indicating that the second payment card will be acting as a proxy for authenticating the declined first authorization request for the payment card with the association data indicative of the association between the payment card and the second payment card that permits the second payment card to act as a proxy for authenticating the declined second authorization request for the payment card.

14. The transaction processing platform of claim 13, wherein the at least one processor is further configured to send a message to a customer that the second payment card has been used as a proxy for authenticating the declined first authorization request for the payment card.

15. The transaction processing platform of claim 12, wherein the at least one processor is further configured to send to the issuer server associated with the second payment card, the second authorization request for the second payment card with the association data indicative of the association between the payment card and the second payment card that permits the second payment card to act as a payment tool for the transaction request for the payment card.

16. The transaction processing platform of claim 15, wherein the at least one processor is further configured to send a message to a customer that the second payment card has been used as the payment tool for the transaction request for the payment card.

17. The transaction processing platform of claim 12, wherein the at least one processor is further configured to receive an approved transaction confirmation from the issuer server associated with the second payment card.

18. The transaction processing platform of claim 17, wherein the at least one processor is further configured to forward the approved transaction confirmation to an acquirer bank server.

19. The transaction processing platform of claim 12, wherein the record of the circuit of payment cards further comprises ranking data indicating a preferred selection order of the at least one other payment card, wherein the at least one processor is further configured to select the second payment card from the at least one other payment card based on the ranking data.

20. The transaction processing platform of claim 12, wherein the at least one processor is further configured to select the second payment card from the at least one other payment card based on configuration parameters.

21. The transaction processing platform of claim 20, wherein the configuration parameters govern the selection of the second payment card from the at least one other payment card based on any one of the following: a type of merchant associated with the transaction request; a mode of the transaction request; a transaction value of the transaction request and a transaction velocity.

22. The transaction processing platform of claim 12, wherein the circuit of payment cards comprises the payment card, at least two other payment cards and association data indicative of the associations between the payment card and the at least two other payment cards that permits each associated payment card in the circuit of payment cards to act as a proxy for authenticating a declined second authorization request for another payment card within the circuit of payment cards or act as a payment tool for the transaction request for another payment card within the circuit of payment cards having declined authorization request, and wherein the at least one processor is further configured to:
receive from the issuer server associated with the second payment card, data indicating that the second authorization request for the second payment card has been declined;
reference, in response to the reception of the second authorization request being denied, the record of the circuit of payment cards;
select a third payment card from the at least two other payment cards;
identify an issuer server associated with the third payment card;
send to the issuer server associated with the third payment card, a third authorization request for the transaction request for the third payment card and the association data indicative of the association between the payment card and the third payment card that permits the third payment card to act as a proxy for authenticating the declined authorization request for the second payment card within the circuit of payment cards or act as a payment tool for the second transaction request for the second payment card within the circuit of payment cards having the declined second authorization request, wherein the issuer server associated with the third payment card approves the third authorization request for the transaction request and forwards the approved third authorization request for the transaction request to the transaction processing platform; and
forwarding the approved third authorization request for the transaction request to an acquirer sever.

\* \* \* \* \*